(12) United States Patent
Ackenhausen et al.

(10) Patent No.: US 11,429,107 B2
(45) Date of Patent: Aug. 30, 2022

(54) PLAY-FORWARD PLANNING AND CONTROL SYSTEM FOR AN AUTONOMOUS VEHICLE

(71) Applicant: Argo AI, LLC, Pittsburgh, PA (US)

(72) Inventors: Thomas Carl Ackenhausen, Ann Arbor, MI (US); Patrick Michael Carmody, Dexter, MI (US); Albert Costa, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 285 days.

(21) Appl. No.: 16/797,109

(22) Filed: Feb. 21, 2020

(65) Prior Publication Data

US 2021/0263524 A1  Aug. 26, 2021

(51) Int. Cl.
   *G05D 1/02* (2020.01)
   *G05D 1/00* (2006.01)

(52) U.S. Cl.
   CPC ......... *G05D 1/0221* (2013.01); *G05D 1/0088* (2013.01); *G05D 2201/0213* (2013.01)

(58) Field of Classification Search
   CPC ............... G05D 1/0221; G05D 1/0088; G05D 2201/0213
   See application file for complete search history.

(56) References Cited

U.S. PATENT DOCUMENTS

| 7,693,624 | B2 | 4/2010 | Duggan et al. |
| 9,612,123 | B1 | 4/2017 | Levinson et al. |
| 9,836,895 | B1 | 12/2017 | Nygaard et al. |
| 10,002,471 | B2 | 6/2018 | Blayvas et al. |
| 10,019,011 | B1 | 7/2018 | Green et al. |
| 10,031,526 | B1 | 7/2018 | Li et al. |
| 10,156,848 | B1 | 12/2018 | Konrardy et al. |

(Continued)

FOREIGN PATENT DOCUMENTS

| CN | 108292474 A | 7/2018 |
| WO | 2015173903 A1 | 11/2015 |
| WO | 20180204544 A1 | 11/2018 |

OTHER PUBLICATIONS

U.S. Appl. No. 17/074,807, filed Oct. 20, 2020, In-Vehicle Operation of Simulation Scenarios During Autonomous Vehicle Runs.

(Continued)

*Primary Examiner* — Anne Marie Antonucci
*Assistant Examiner* — Jingli Wang
(74) *Attorney, Agent, or Firm* — Fox Rothschild LLP

(57) ABSTRACT

A system of creating a simulation to simulate behavior of an autonomous vehicle includes a simulation system having an electronic device and a computer-readable storage medium having one or more programming instructions. When executed, the one or more programming instructions cause the electronic device to identify an event that is to be analyzed, receive from an autonomous vehicle system a first data stream that includes event information from one or more vehicle event log files that corresponds to the event, receive from a vehicle dynamics model a second data stream that includes synthetic event information that corresponds to the event, until a switch point is detected operate in a pure log execution stage, upon detection of the switch point operate in a play-forward execution stage, and cause the new simulation to be executed.

18 Claims, 7 Drawing Sheets

(56) References Cited

U.S. PATENT DOCUMENTS

| | | | |
|---|---|---|---|
| 10,395,433 | B2 | 8/2019 | Tomatsu |
| 10,453,260 | B2 | 10/2019 | Alaniz et al. |
| 10,852,721 | B1 | 12/2020 | Smith et al. |
| 2005/0209983 | A1 | 9/2005 | MacPherson |
| 2008/0040004 | A1 | 2/2008 | Breed |
| 2008/0040029 | A1 | 2/2008 | Breed |
| 2010/0115411 | A1 | 5/2010 | Sorokin et al. |
| 2011/0167574 | A1 | 7/2011 | Stout et al. |
| 2014/0289174 | A1 | 9/2014 | Statnikov et al. |
| 2016/0314224 | A1 | 10/2016 | Wei et al. |
| 2017/0113664 | A1 | 4/2017 | Nix |
| 2017/0267233 | A1 | 9/2017 | Minster et al. |
| 2018/0107770 | A1 | 4/2018 | Cahoon et al. |
| 2018/0188727 | A1 | 7/2018 | Zhuang et al. |
| 2018/0365888 | A1 | 12/2018 | Satzoda et al. |
| 2019/0004528 | A1 | 1/2019 | Zhan et al. |
| 2019/0228118 | A1* | 7/2019 | Hummelshoj .......... G06F 30/20 |
| 2019/0250622 | A1 | 8/2019 | Nister et al. |
| 2019/0301886 | A1 | 10/2019 | Elangovan et al. |
| 2019/0354643 | A1 | 11/2019 | Shum et al. |
| 2019/0377351 | A1 | 12/2019 | Phillips et al. |
| 2020/0050536 | A1* | 2/2020 | Nygaard ............. G06F 11/3684 |
| 2020/0082248 | A1 | 3/2020 | Villegas et al. |
| 2020/0192391 | A1 | 6/2020 | Vora et al. |
| 2020/0209874 | A1 | 7/2020 | Chen et al. |
| 2020/0218979 | A1 | 7/2020 | Kwon et al. |
| 2020/0284883 | A1 | 9/2020 | Ferreira et al. |
| 2020/0309561 | A1 | 10/2020 | Li et al. |
| 2020/0341466 | A1 | 10/2020 | Pham et al. |
| 2021/0096566 | A1 | 4/2021 | Wang et al. |
| 2021/0108936 | A1 | 4/2021 | Seegmiller et al. |
| 2021/0309248 | A1 | 10/2021 | Choe et al. |

OTHER PUBLICATIONS

U.S. Appl. No. 16/797,103, filed Feb. 21, 2020, Systems and Methods for Generating Simulation Scenario Definitions for an Autonomous Vehicle System.

U.S. Appl. No. 17/178,333, filed Feb. 18, 2021, Rare Event Simulation in Autonomous Vehicle Motion Planning.

van der Made, R. et al., "Automated Generation of Virtual Driving Scenarios from Test Drive Data", 24th International Technical Conference on the enhanced Safety of Vehicles (ESV), Jun. 8, 2015-Jun. 11, 2015.

Rocklage, E. et al., "Automated Scenario Generation for Regression Testing of Autonomous Vehicles", 2017 IEEE 20th International Conference on Intelligent Transportation Systems (ISC): Workshop.

Coelingh, E. et al., "Creating Driving Tests for Self-Driving Cars," IEEE Spectrum, Feb. 2018.

Liu, H. et al., "Real World Meets Virtual World: Augmented Reality Makes Driverless Vehicle Testing Faster, Safer and Cheaper," University of Michigan, pp. 1-8, Nov. 2018.

Stackpole, B. "Mcity Adds Augmented Reality to Driverless Car Testing Roadmap," Digital Engineering 247, Dec. 2018.

Gonzalez, D. et al., "A Review of Motrion Planning Techniques for Automated Vehicles," IEEE Transactions on Intelligent, Transportation Systems, vol. 17, No. 4, pp. 1135-1145, Apr. 2016.

Yurtsever, E., et al., "A Survey of Autonomous Driving: Common Practices and Emerging Technologies," IEEE Access, vol. 8, [cs RD], Apr. 2020.

"We Deliver the Promise of Autonomy," https://edge-case-research.com/products-services/, Oct. 14, 2020.

Bolte, J.A. et al. "Towards Comer Case Detection for Autonomous Driving," arXiv:1902.09184vs [cs:CV] Feb. 26, 2019.

Koopman, P. "Edge Cases and Autonomoous Vehicle Safety," Edge Case Research, SSS 2019, Bristol, Feb. 7, 2019.

Beck, J. et al. "Rare-Event Simulation," Springer International Publishing Switzerland 2015 R. Ghanem et al. (eds.), Handbook of Uncertainty Quantification, DOI 10.1007/978-3-319-11259-6_24-1, pp. 1-26.

Guldogus, M., "Proof of Concept of Closed Loop Re-Simulation (CLR) Methods in Verification of Autonomous Vehicles", KTH Schoold of Electrical Engineering (EES), Master's Thesis, 2017.

Markkula, G., "Driver behavior models for evaluating automotive active safety", Department of Applied Mechanics, Chalmers University of Technology, Goteborg, Sweden 2015.

NVIDIA Self-Driving Safety Report, 2018.

* cited by examiner

PLAY-FORWARD PLANNING AND CONTROL SYSTEM FOR AN AUTONOMOUS VEHICLE

BACKGROUND

It is necessary to test the planning and control algorithms of an autonomous vehicle system across a wide variety of situations to ensure that they perform appropriately. This testing often happens offline in reproducible but realistic simulated conditions, and as part of in-vehicle testing. In an offline environment, surrogate input data is typically provided to the algorithms that are under test and the output is evaluated.

One mechanism for performing offline testing uses simulation to generate surrogate perception data by applying a sensor model to elements in a virtual world in order to generate surrogate data and feed that data into the algorithms that are under test. However, the generation of surrogate perception data relies on sensor models, which are an approximation of actual perception performance. These models do not perfectly reflect the characteristics of an actual perception system output in situations being tested. This introduces a level of uncertainty into the simulation test results.

An alternative approach for performing offline testing is to use perception data that was captured into a log during an actual autonomous vehicle drive, and then play that log data back into the algorithms being tested as input. However, since the data being played back is a recording of what originally happened in the autonomous vehicle, the system cannot respond to any differences in behavior that would be produced by the algorithms under test. If the output of these algorithms would result in a divergence from the original path which was followed by the autonomous vehicle, then this will not be reflected in the input data coming from the original log.

SUMMARY

In an embodiment, a system of creating a simulation to simulate behavior of an autonomous vehicle, the system includes a simulation system having an electronic device and a computer-readable storage medium having one or more programming instructions. When executed, the one or more programming instructions cause the electronic device to identify an event that is to be analyzed, receive from an autonomous vehicle system a first data stream that includes event information from one or more vehicle event log files that corresponds to the event. The event information includes the following obtained by one or more sensors of an autonomous vehicle during occurrence of the event: first perception information, first pose information, and first control information. When executed, the one or more programming instructions cause the electronic device to receive from a vehicle dynamics model a second data stream that includes synthetic event information that corresponds to the event. The synthetic event information is generated by a simulation that simulates operation of the autonomous vehicle in a virtual environment. The synthetic information includes the following: second pose information, and second control information. When executed, the one or more programming instructions cause the electronic device to, until a switch point is detected, operate in a pure log execution stage by using at least a portion of the first perception information in a new simulation of the autonomous vehicle, using at least a portion of the first pose information in the new simulation, and using at least a portion of the first control information in the new simulation. When executed, the one or more programming instructions cause the electronic device to, upon detection of the switch point, operate in a play-forward execution stage by using at least a portion of the first perception information into the new simulation, using at least a portion of the second pose information in the new simulation, and using at least a portion of the second control information in the new simulation, and cause the new simulation to be executed.

The system may identify an event that is to be analyzed by receiving from a user an indication of a time period during which the event occurred.

The first data stream may include event information organized in a time sequential fashion.

The system may detect the switch point by identifying an event indicator in the event information, determining a timestamp associated with the event indicator, and detecting the switch point at the timestamp. The event indicator may indicate the beginning of the event.

The system may, upon detection of the switch point, transform the first perception information by moving track position data from the event information into a map reference frame, and moving data from the map reference frame to a simulation frame. The switch point may correspond to a point at which the simulation diverges from the event as depicted by event information from the one or more vehicle event log files.

The system may cause the electronic device to not use any portion of the synthetic event information during operation in the pure log execution stage. The system may cause the electronic device to not using any portion of the first control information during operation in the play-forward execution stage.

The system may cause the electronic device to not using any portion of the first pose information during operation in the play-forward execution stage.

DETAILED DESCRIPTION

Figure 1:
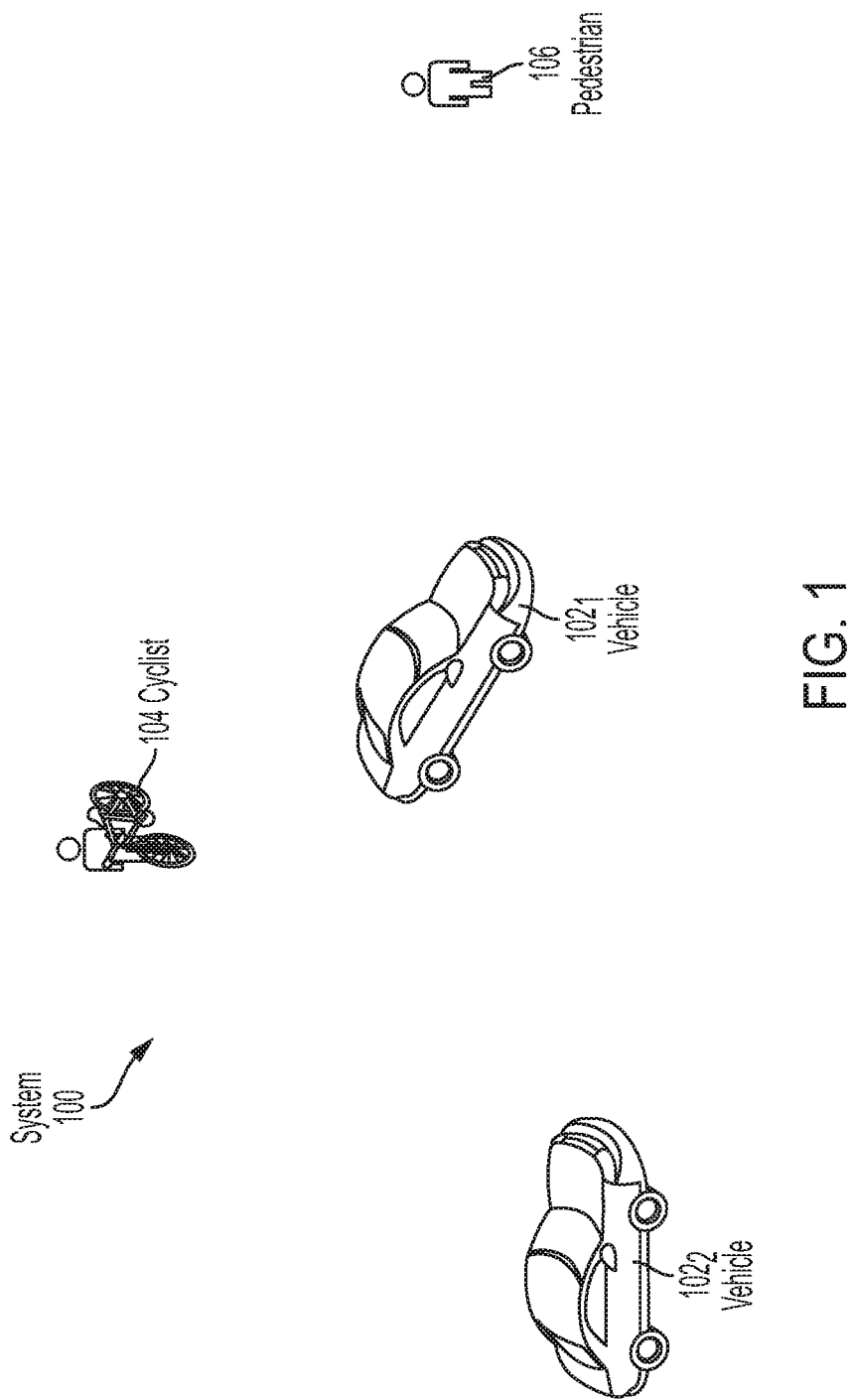
FIG. 1 illustrates an example autonomous vehicle.

FIG. 1 illustrates an example system 100 that includes a vehicle 102 that is traveling along a road in a semi-autonomous or autonomous manner. Vehicle 102 is also referred to in this document as an Autonomous Vehicle or AV. The AV 102 can include, but is not limited to, a land vehicle (as shown in FIG. 1) such as an automobile, truck or van; an aircraft; or a watercraft.

Figure 2:
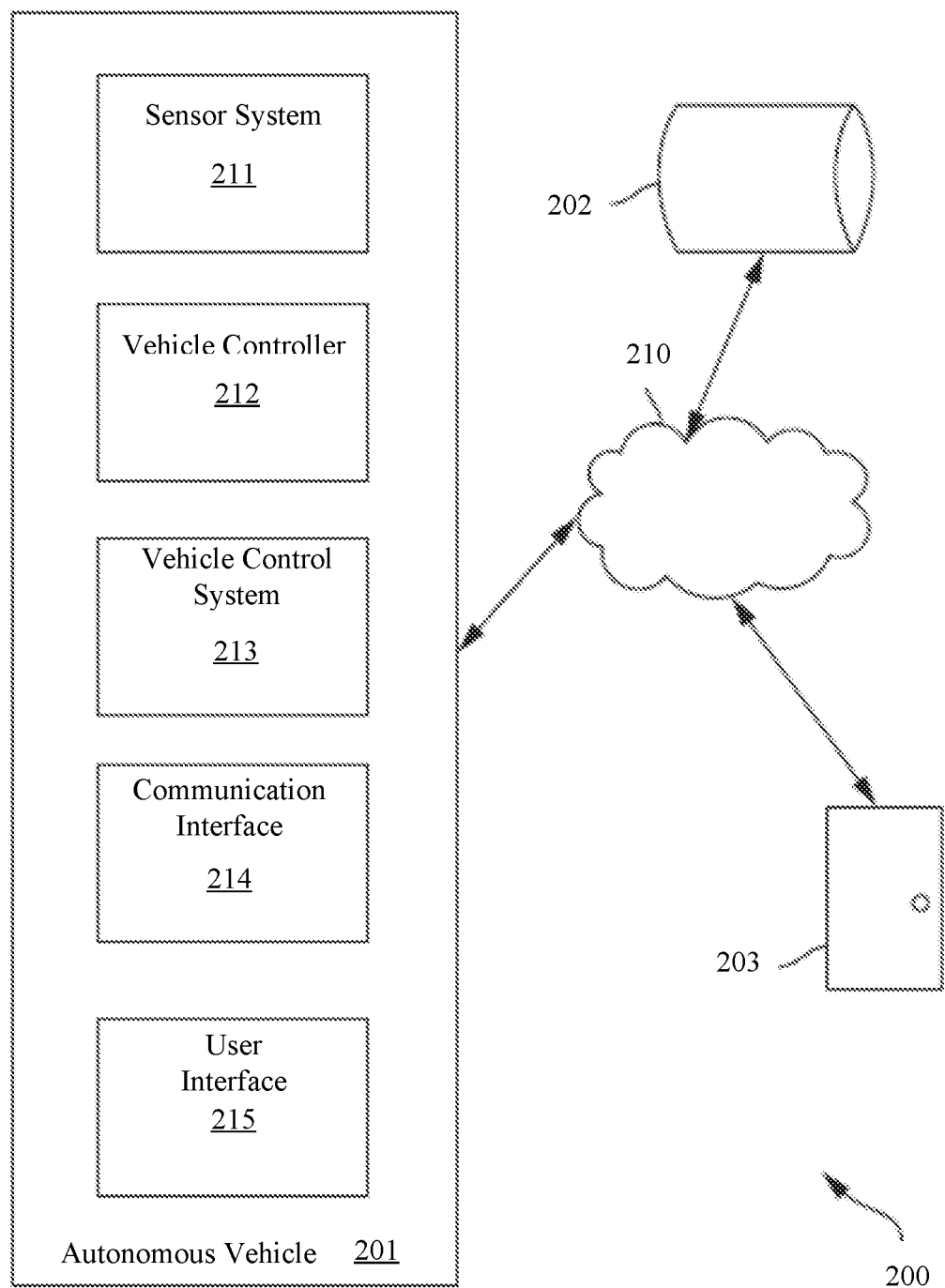
FIG. 2 illustrates an example system architecture for a vehicle.

FIG. 2 illustrates an example system architecture 200 for a vehicle, such as an AV. AV 102 of FIG. 1 can have the same or similar system architecture as that shown in FIG. 2. Thus, the following discussion of system architecture 200 is sufficient for understanding vehicle 102 of FIG. 1.

FIG. 2 is a block diagram illustrating an example system 200 that includes an autonomous vehicle 201 in communication with one or more data stores 202 and/or one or more servers 203 via a network 210. Although there is one autonomous vehicle shown, multiple autonomous vehicles may be coupled to each other and/or coupled to data stores 202 and/or servers 203 over network 210. Network 210 may be any type of network such as a local area network (LAN), a wide area network (WAN) such as the Internet, a cellular network, a satellite network, or a combination thereof, and may be wired or wireless. Data store(s) 202 may be any kind of data stores such as, without limitation, map data stores, traffic information data stores, user information data stores, point of interest data store(s), or any other type of content data store(s). Server(s) 203 may be any kind of servers or a cluster of servers, such as, without limitation, Web or cloud servers, application servers, backend servers, or a combination thereof.

As illustrated in FIG. 2, the autonomous vehicle 201 may include a sensor system 211, a vehicle controller 212, a vehicle control system 213, a communications interface 214, and a user interface 215. Autonomous vehicle 201 may further include certain components (not shown here) included in vehicles, such as, an engine, wheels, steering wheel, transmission, etc., which may be controlled by vehicle control system 212 using a variety of communication signals and/or commands, such as, for example, acceleration signals or commands, deceleration signals or commands, steering signals or commands, braking signals or commands, etc.

The sensor system 211 may include one or more sensors that are coupled to and/or are included within the autonomous vehicle 201. Examples of such sensors include, without limitation, a Light Detection and Ranging (LiDAR) system, a Radio Detection and Ranging (RADAR) system, one or more cameras (e.g., visible spectrum cameras, infrared cameras, etc.), temperature sensors, position sensors, location sensors (e.g., global positioning system (GPS), etc.), clocks, fuel sensors, speed sensors, odometer sensor, motion sensors (e.g., inertial measurement units (IMU), accelerometer, gyroscope, etc.), object detection sensors such as one or more cameras, humidity sensors, environmental sensors (e.g., a precipitation sensor and/or ambient temperature sensor) occupancy sensors, or the like. The sensor data can include information that describes the location of objects within the surrounding environment of the autonomous vehicle 102, information about the environment itself, information about the motion of the autonomous vehicle 102, information about a route of the autonomous vehicle, or the like.

Figure 3:
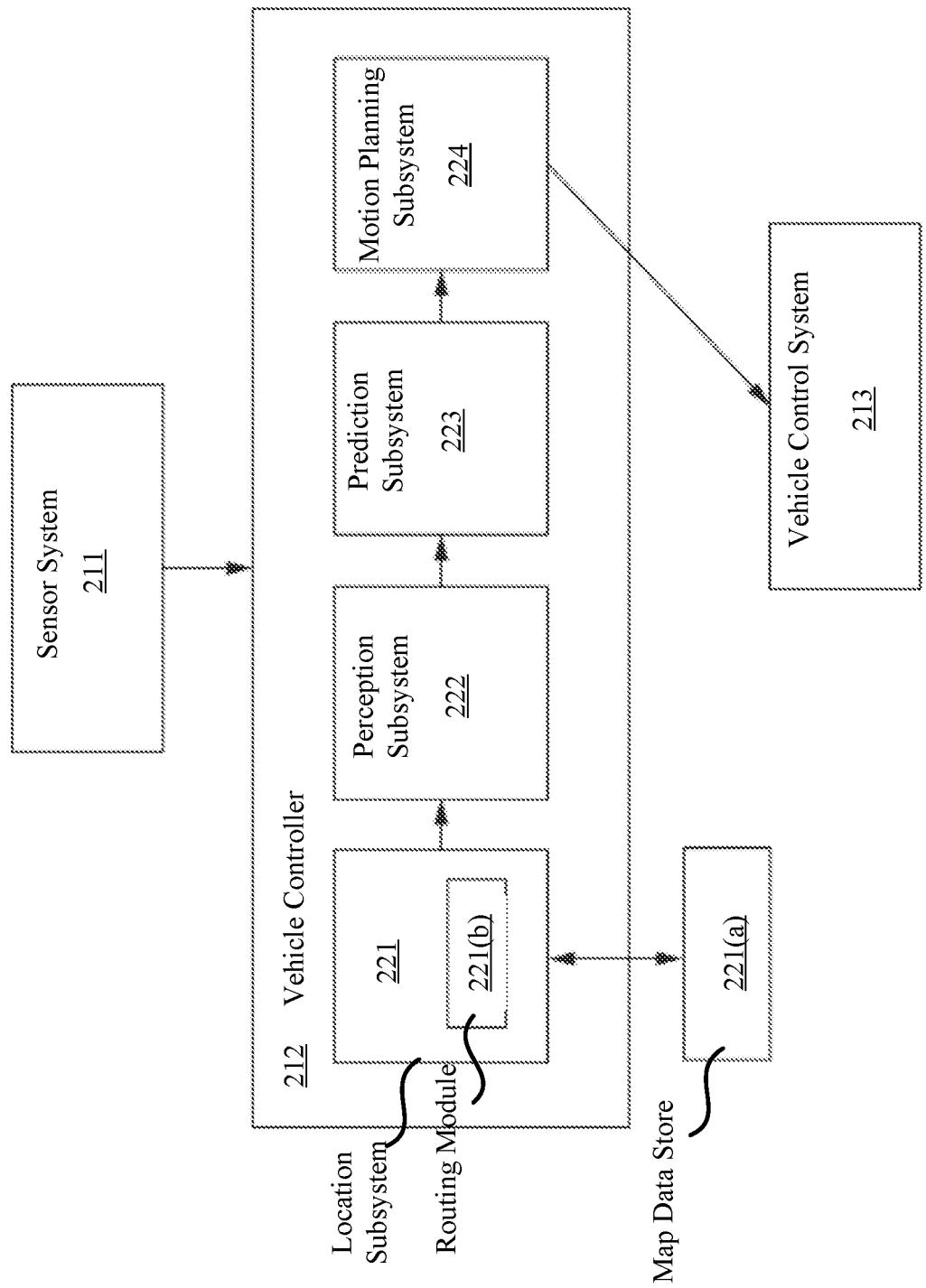
FIG. 3 illustrates a block diagram of various components of an example controller of an autonomous vehicle.

As shown in FIG. 3, the vehicle controller 212 may receive data collected by the sensor system 211 and analyze it to provide one or more vehicle control instructions to the vehicle control system 213. The vehicle controller 212 may include, without limitation, a location subsystem 221, a perception subsystem 222, a prediction subsystem 223, and a motion planning subsystem 224.

A location subsystem 221 refers to one or more programming instructions that, when executed by an autonomous vehicle (or one or more processors of an autonomous vehicle), cause the autonomous vehicle to obtain or retrieve map data (e.g., from a map data store 221(*a*)) that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle controller 212 in analyzing the surrounding environment of the autonomous vehicle. In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on a historical observations of vehicles or other objects over a period of time (e.g., reference paths for straight line travel, lane merge, a turn, or the like).

In certain embodiments, the location subsystem 221 may also include and/or may receive information relating to the trip or route of a user, real-time traffic information on the route, or the like.

The location subsystem 221 may include and/or may be in communication with a routing module 221(*b*) that generates a navigation route from a start position to a destination position for an autonomous vehicle. The routing module 212(*b*) may access the map data store 212(*a*) to identify possible routes and road segments that a vehicle can travel on to get from the start position to the destination position. The routing module 212(*b*) may score the possible routes and identify a preferred route to reach the destination. For example, the routing module 212(*b*) may generate a navigation route that minimizes Euclidean distance traveled or other cost function during the route, and may further access the traffic information and/or estimates that can affect an amount of time it will take to travel on a particular route. Depending on implementation, the routing module 212(*b*) may generate one or more routes using various routing methods, such as Dijkstra's algorithm, Bellman-Ford algorithm, or other algorithms. The routing module 212(*b*) may also use the traffic information to generate a navigation route that reflects expected conditions of the route (e.g., current day of the week or current time of day, etc.), such that a route generated for travel during rush-hour may differ from a route generated for travel late at night. The routing module 212(*b*) may also generate more than one navigation route to a destination and send more than one of these navigation routes to a user for selection by the user from among various possible routes.

A perception subsystem 222 refers to one or more programming instructions that, when executed by an autonomous vehicle (or one or more processors of an autonomous vehicle), cause the autonomous vehicle to determine perception information of the surrounding environment of the autonomous vehicle. Based on the sensor data provided by sensor system 211 and information obtained by the location subsystem 221, the perception subsystem 222 may determine perception information of the surrounding environment of the autonomous vehicle 201 during travel from the start position to the destination along the preferred route. The perception information may represent what an ordinary driver would perceive in the surrounding environment of a vehicle. The perception data may include information relating to one or more objects in the environment of the autonomous vehicle 201. For example, the perception subsystem 222 may process sensor data (e.g., LiDAR or RADAR data, camera images, etc.) in order to identify objects and/or features in the environment of an autonomous vehicle. The objects may include traffic signals, roadway boundaries, other vehicles, pedestrians, and/or obstacles, etc. The perception subsystem 222 may use any now or hereafter known object recognition algorithms, video tracking algorithms, and computer vision algorithms (e.g., track objects frame-to-frame iteratively over a number of time periods) to determine the perception.

In some embodiments, the perception subsystem 222 may also determine, for one or more identified objects in the environment, the current state of the object. The state information may include, without limitation, for each object: current location; current speed and/or acceleration, current heading; current orientation; size/footprint; type (e.g., vehicle vs. pedestrian vs. bicycle vs. static object or obstacle); and/or other state information.

A prediction subsystem 223 refers to one or more programming instructions that, when executed by an autonomous vehicle (or one or more processors of an autonomous vehicle), cause the autonomous vehicle to predict future locations, trajectories, and/or actions of one or more objects. For example, the prediction subsystem 223 may predict the future locations, trajectories, and/or actions of the objects based at least in part on perception information (e.g., the state data for each object) received from the perception subsystem 222, the location information received from the location subsystem 221, the sensor data, and/or any other data that describes the past and/or current state of the objects, the autonomous vehicle 201, the surrounding environment, and/or their relationship(s).

A motion planning subsystem 224 refers to one or more programming instructions that, when executed by an autonomous vehicle (or one or more processors of an autonomous vehicle), cause the autonomous vehicle to determine a motion plan for the autonomous vehicle. For example, the motion planning subsystem 224 may determine a motion plan for the autonomous vehicle based on the perception data and/or the prediction data. Specifically, given predictions about the future locations of proximate objects and other perception data, the motion planning subsystem 224 can determine a motion plan for the autonomous vehicle 201 that best navigates the autonomous vehicle 201 relative to the objects at their future locations.

In one or more embodiments, the motion planning subsystem 224 may receive the predictions from the prediction subsystem 223 and make a decision regarding how to handle objects in the environment of the autonomous vehicle 201. For example, for a particular object (e.g., a vehicle with a given speed, direction, turning angle, etc.), motion planning subsystem 224 decides whether to overtake, yield, stop, and/or pass based on, for example, traffic conditions, map data, state of the autonomous vehicle, etc. In some embodiments, for a given object, the motion planning subsystem 224 may decide what to do with the object and may determine how to do it. For example, for a given object, the motion planning subsystem 224 may decide to pass the object, and then may determine whether to pass on the left side or right side of the object (including motion parameters such as speed, and lane change decisions). The motion planning subsystem 224 may also assess the risk of a collision between a detected object and the autonomous vehicle 201. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the controller 220 may transmit appropriate control instructions to the vehicle control system 213 for execution to perform a cautious maneuver (e.g., mildly slow down, accelerate, change lane, or swerve). In contrast, if the collision cannot be avoided, then the controller 220 may transmit appropriate control instructions to the vehicle control system 213 for execution of an emergency maneuver (e.g., brake and/or change direction of travel).

Furthermore, the motion planning subsystem 224 also plans a trajectory ("trajectory generation") for the autonomous vehicle 201 to travel on a given route (e.g., a nominal route generated by the routing module 212(b)). The trajectory specifies the spatial path for the autonomous vehicle as well as a velocity profile. The controller converts the trajectory into control instructions for the vehicle control system, including but not limited to throttle/brake and steering wheel angle commands. Trajectory generation may involve making decisions relating to lane changes, such as, without limitation, whether a lane change is required, where to perform a lane change, and when to perform a lane change. Specifically, one objective of the motion planning subsystem 224 is to generate a trajectory for motion of the vehicle from a start position to a destination on the nominal route, taking into account the perception and prediction data.

The motion planning subsystem 224 may generate the trajectory by performing topological planning to generate a set of constraints for each of a plurality of topologically distinct classes of trajectories, optimizing a single candidate trajectory for each class, and scoring the candidate trajectories to select an optimal trajectory. Topological classes are distinguished by the discrete actions taken with respect obstacles or restricted map areas. Specifically, all possible trajectories in a topologically distinct class takes the same action with respect to obstacles or restricted map areas. Obstacles may include, for example, static objects such as traffic cones and bollards, or other road users such as pedestrians, cyclists, and cars. Restricted map areas may include, for example, crosswalks and intersections. Discrete actions may include, for example, to stop before or proceed through, to track ahead or behind, or to pass on the left or right of something.

The motion planning subsystem may use the preferred route information provided by the routing module 212(b) in combination with perception data and/or select the optimal trajectory, as discussed below.

As discussed above, planning and control data regarding the movement of the autonomous vehicle is generated by the motion planning subsystem 224 of the controller 220 that is transmitted to the vehicle control system 213 for execution. The vehicle control system 213 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the controller to make decisions and use the decisions to control operations of one or more vehicle systems via the vehicle control system of the vehicle. However, the embodiments are not limited to this arrangement, as in various embodiments the analysis, decision making and or operational control may be handled in full or in part by other computing devices that are in electronic communication with the vehicle's on-board controller and/or vehicle control system. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Referring back to FIG. 2, the communications interface 214 may be configured to allow communication between autonomous vehicle 201 and external systems, such as, for example, external devices, sensors, other vehicles, servers, data stores, databases etc. Communications interface 214 may utilize any now or hereafter known protocols, protection schemes, encodings, formats, packaging, etc. such as, without limitation, Wi-Fi, an infrared link, Bluetooth, etc. User interface system 215 may be part of peripheral devices implemented within vehicle 201 including, for example, a keyword, a touch screen display device, a microphone, and a speaker, etc.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision-making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

As an AV progresses along a route, it may encounter a variety of different events along the way. An event refers to an action, interaction, occurrence or environmental condition that may affect operation or a decision-making process of an AV. Example events include, without limitation, a pedestrian walking in proximity to an AV, a traffic light status, a vehicle passing the AV, a vehicle turning in front of the AV, and/or the like.

Event information pertaining to one or more encountered events may be captured by one or more sensors of an AV, such as, for example, one or more sensors of a vehicle's sensor system 211. Event information may include without limitation, perception data, pose data, and/or control data. Perception data refers to information obtained by one or more sensors of an AV pertaining to its environment. Examples of perception data include, without limitation, LiDAR data.

Pose information refers to information pertaining to a pose of an AV. The term pose refers to a representation of a vehicle's location, orientation, acceleration and/or velocity. For example pose information may include data pertaining to one or more map coordinates (e.g., x, y, z) associated with an AV's position, or one or more inertial measurement unit coordinate frames. As another example, pose information may include data pertaining to longitudinal, lateral and/or yaw components or measurements of acceleration.

Control information refers to information or data pertaining to the operation of the AV or one or more components of the AV. For example, control information may include data pertaining to one or more operational actions of the AV such as, for example, accelerating, decelerating, braking, coming to a stop, making a turn, reversing, and/or the like. Examples of such data may include, without limitation, a steering wheel angle, a torque, a road wheel angle, and/or the like. In various embodiments, at least a portion of event information that is captured during operation of an AV may be stored by the AV in one or more vehicle event log files.

Figure 4:
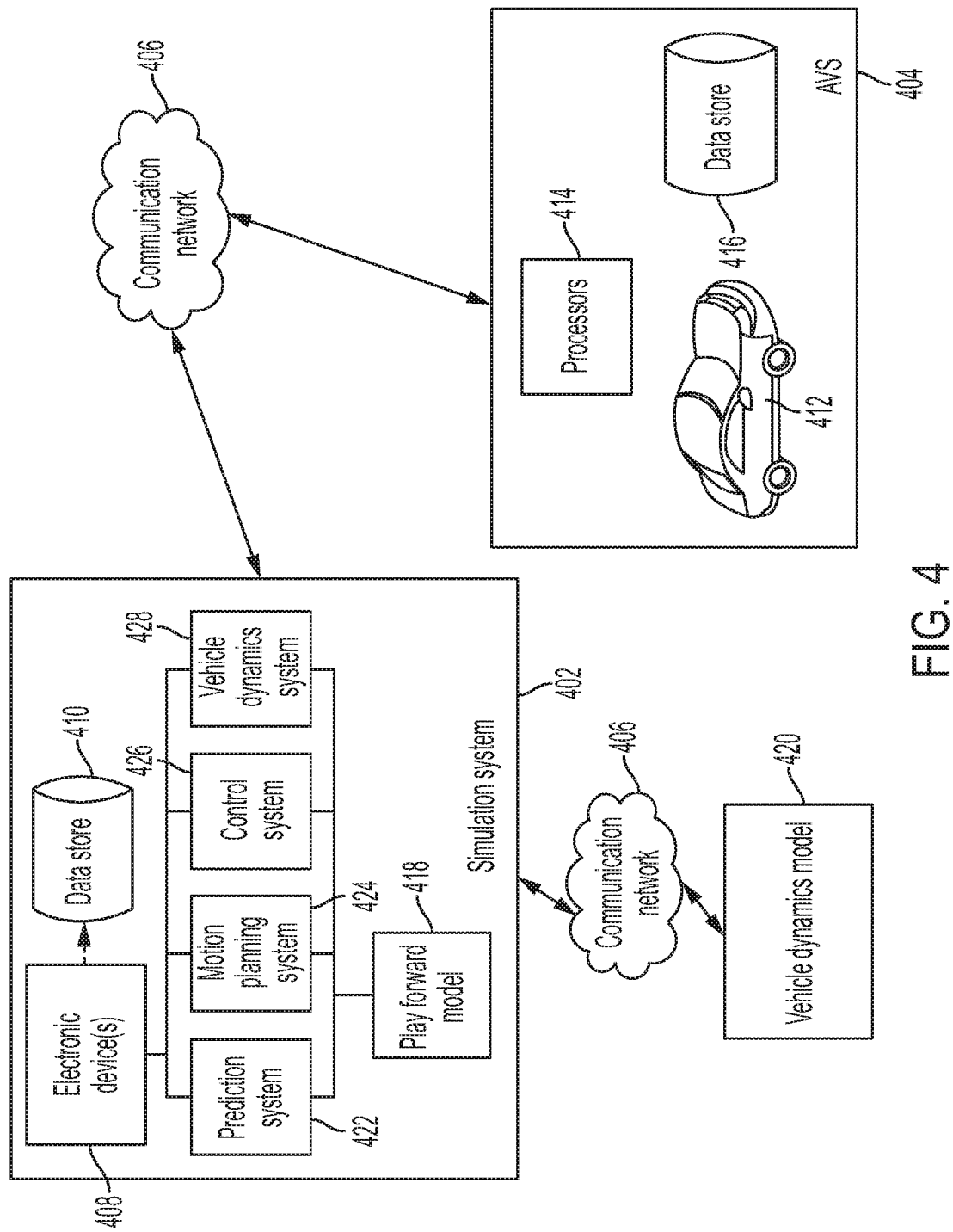
FIG. 4 illustrates an example system of evaluating one or more algorithms.

FIG. 4 illustrates an example system of evaluating one or more planning or control algorithms according to an embodiment. As illustrated by FIG. 4, the system may include a simulation system 402 in communication with an AVS 404 via one or more communication networks 406. A simulation system 402 may include one or more electronic devices 408 and one or more data stores 410. A simulation system 402 may include one or more subsystems such as, for example, a prediction system 422, a motion planning system 424, a control system 426, a vehicle dynamics system 428, and/or the like. The electronic devices 408 may be used to evaluate or test one or more algorithms. One or more of the algorithms may correspond to one or more of the subsystems such as, for example, algorithms pertaining to motion planning or control of an autonomous vehicle.

A prediction system 422 may predict future locations, trajectories, and/or actions of objects in a simulation. This prediction may be based at least in part on perception information, location information, sensor data, data that describes the past and/or current state of objects (in a surrounding environment and/or in simulation), the autonomous vehicle, the surrounding environment, and/or their relationship(s).

A motion planning subsystem 424 may determine a motion plan for a simulated autonomous vehicle based on at least the perception data and/or the prediction data. Specifically, given predictions about the future locations of proximate objects and other perception data, the motion planning subsystem 424 may determine a motion plan for a simulated autonomous vehicle that best navigates the autonomous vehicle relative to the objects at their future locations.

In one or more embodiments, a motion planning subsystem 424 may receive the predictions from the prediction 422 and make a decision regarding how to handle objects in the environment of the autonomous vehicle. For example, for a particular object (e.g., a vehicle with a given speed, direction, turning angle, etc.), motion planning subsystem 424 decides whether to overtake, yield, stop, and/or pass based on, for example, traffic conditions, map data, state of the autonomous vehicle, etc. In some embodiments, for a given object, the motion planning subsystem 424 may decide what to do with the object and may determine how to do it.

A motion planning subsystem 424 also plans a trajectory ("trajectory generation") for the autonomous vehicle to travel on a given route. The trajectory specifies the spatial path for the autonomous vehicle as well as a velocity profile. The controller converts the trajectory into control instructions for the vehicle control system, including but not limited to throttle/brake and steering wheel angle commands. Trajectory generation may involve making decisions relating to lane changes, such as, without limitation, whether a lane change is required, where to perform a lane change, and when to perform a lane change. Specifically, one objective of the motion planning subsystem 424 is to generate a trajectory for motion of the vehicle from a start position to a destination on the nominal route, taking into account the perception and prediction data.

The motion planning subsystem 424 may generate the trajectory by performing topological planning to generate a set of constraints for each of a plurality of topologically distinct classes of trajectories, optimizing a single candidate trajectory for each class, and scoring the candidate trajectories to select an optimal trajectory. Topological classes are distinguished by the discrete actions taken with respect obstacles or restricted map areas. Specifically, all possible trajectories in a topologically distinct class takes the same action with respect to obstacles or restricted map areas. Obstacles may include, for example, static objects such as traffic cones and bollards, or other road users such as pedestrians, cyclists, and cars. Restricted map areas may include, for example, crosswalks and intersections. Discrete actions may include, for example, to stop before or proceed through, to track ahead or behind, or to pass on the left or right of something.

A control system 426 may control one or more actions of a simulated autonomous vehicle. For example, a control system 426 may control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

A vehicle dynamics system 428 may determine a dynamic state of a simulated autonomous vehicle. For example, a vehicle dynamics system 428 may determine a dynamic state of a simulated autonomous vehicle based on rotation and acceleration of the autonomous vehicle.

In various embodiments, a play-forward model, as described in more detail below, may be part of a simulation system. A play-forward model refers to one or more algorithms, such as for example, one or more AV planning or control algorithms, that are used to simulate behavior of an AV in a virtual environment.

As illustrated in FIG. 4, the AVS 404 may include an AV 412 having one or more processors 414 and having or being in communication with one or more data stores 416. One or more of the data stores 416 may store one or more of the vehicle's event log files. In various embodiments, event log files corresponding to an autonomous vehicle may be stored in one or more data stores located remotely from the autonomous vehicle.

As illustrated in FIG. 4, a vehicle dynamics model 420 may be in communication with a simulation system 402 according to an embodiment. A vehicle dynamics model 420 refers to a simulation program that operates on a processor and calculates position and motion of a vehicle in a virtual environment based on various inputs and environmental conditions. A vehicle dynamics model 420 may reside on one or more electronic devices remote from the simulation system 402 and may be in operable communication with a simulation system via one or more communication networks 406. In an alternate embodiment, a vehicle dynamics model 420 may be a part of the simulation system 402.

Figure 5:
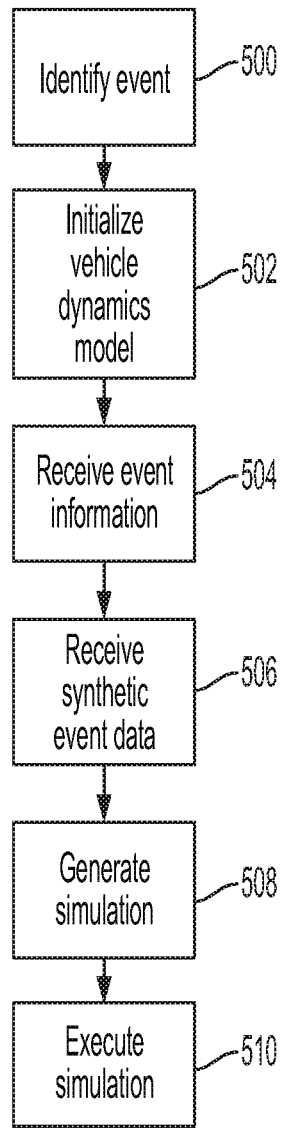
FIG. 5 illustrates an example method of performing simulation using a play-forward model.

FIG. 5 illustrates an example method of performing simulation using a play-forward model according to an embodiment. In play-forward simulation, event information that is captured by an AV in one or more event logs may be played into one or more algorithms, such as one or more planning or control algorithms, that are being evaluated. In addition, a vehicle dynamics model may also be run, and the outputs of the vehicle dynamics model may be fed into a play-forward model to generate a simulation of AV behavior. This behavior may include one or more new poses associated with an AV.

However, if any of the algorithms being evaluated store internal state, then a period of pure log playback may be needed prior to performing play-forward simulation in order to put the algorithms into a state that is similar to the state during original execution. This will improve the accuracy of algorithm performance once simulation is commenced. In order to build up state, the input and output channels associated with the algorithms being evaluated may be routed depending on the stage of execution.

As illustrated by FIG. 5, an event that is to be evaluated may be identified 500. An event that is to be evaluated may correspond to information that is logged over a certain period of time. In various embodiments, a system user may define what event information is to be evaluated. For instance, a system user may define a period of time during the operation of an AV for which event information should be evaluated. As another example, a system user may define an event for which event information is to be evaluated (e.g., an AV that approaches and navigates an intersection). Event information corresponding to the defined event may be evaluated.

Referring to FIG. 5, a vehicle dynamics model may be initialized 502. A vehicle dynamics model refers to a simulation program that calculates position and motion of a vehicle in a virtual environment based on various inputs and environmental conditions. The inputs and environmental conditions may be specified by a system user. For instance, a vehicle dynamics model may be initialized 502 using inputs and/or environmental conditions that are the same or similar to those present in at least a portion of the identified event information. For instance, if the event information indicates that an AV is traveling north at a velocity of 50 miles per hour and an acceleration of 3 m/s', then the system may initialize a vehicle dynamics model to reflect the same or similar conditions.

In various embodiments, a user may provide a vehicle dynamics model with one or more inputs that may diverge from those experienced by an AV and therefore logged by the AV in one or more event log files. The one or more inputs may correspond to one or more events for which the user would like to simulate AV behavior. For instance, when an AV encountered a four-way intersection, the AV may have in actuality proceeded straight through the intersection. As such, the event log files of the AV may reflect perception information that corresponds with this maneuver. However, a system user may want to simulate how the AV would have handled a right-hand turn at that intersection. A system user may provide one or more instructions or inputs to the vehicle dynamics model for the AV to turn right at the intersection.

The vehicle dynamics model may generate a data set of synthetic event data by operating a virtual vehicle in a simulated environment of the vehicle dynamics model. At least a portion of the synthetic event data may be provided to a play-forward model of a simulation system as described in more detail below.

A simulation system may receive 504 event information. The simulation system may receive 504 event information from one or more vehicle event log files associated with an autonomous vehicle. The event information may include information pertaining to one or more events actually encountered by the associated autonomous vehicle during operation in a real-world environment. In various embodiments, event information may be provided to a simulation system as part of a data stream. The event information may be obtained from one or more event logs and may be provided to the simulation system as a part of a data stream in a time sequential order. For instance, event information that is stored in one or more vehicle event log files may be associated with a timestamp that corresponds to a time (e.g., date, hour, minute, second, year, etc.) at which the event information was obtained. This information may be provided to a simulation system as part of a data stream in sequential order based on timestamp.

As illustrated in FIG. 5, a simulation system may receive 506 synthetic event data from a vehicle dynamics model. In various embodiments, synthetic event information may be provided to a simulation system as part of a data stream. The synthetic event information may be generated from a simulation run by a vehicle dynamic model. The synthetic event information may be provided to the simulation system as a part of a data stream in a time sequential order.

Figure 6:
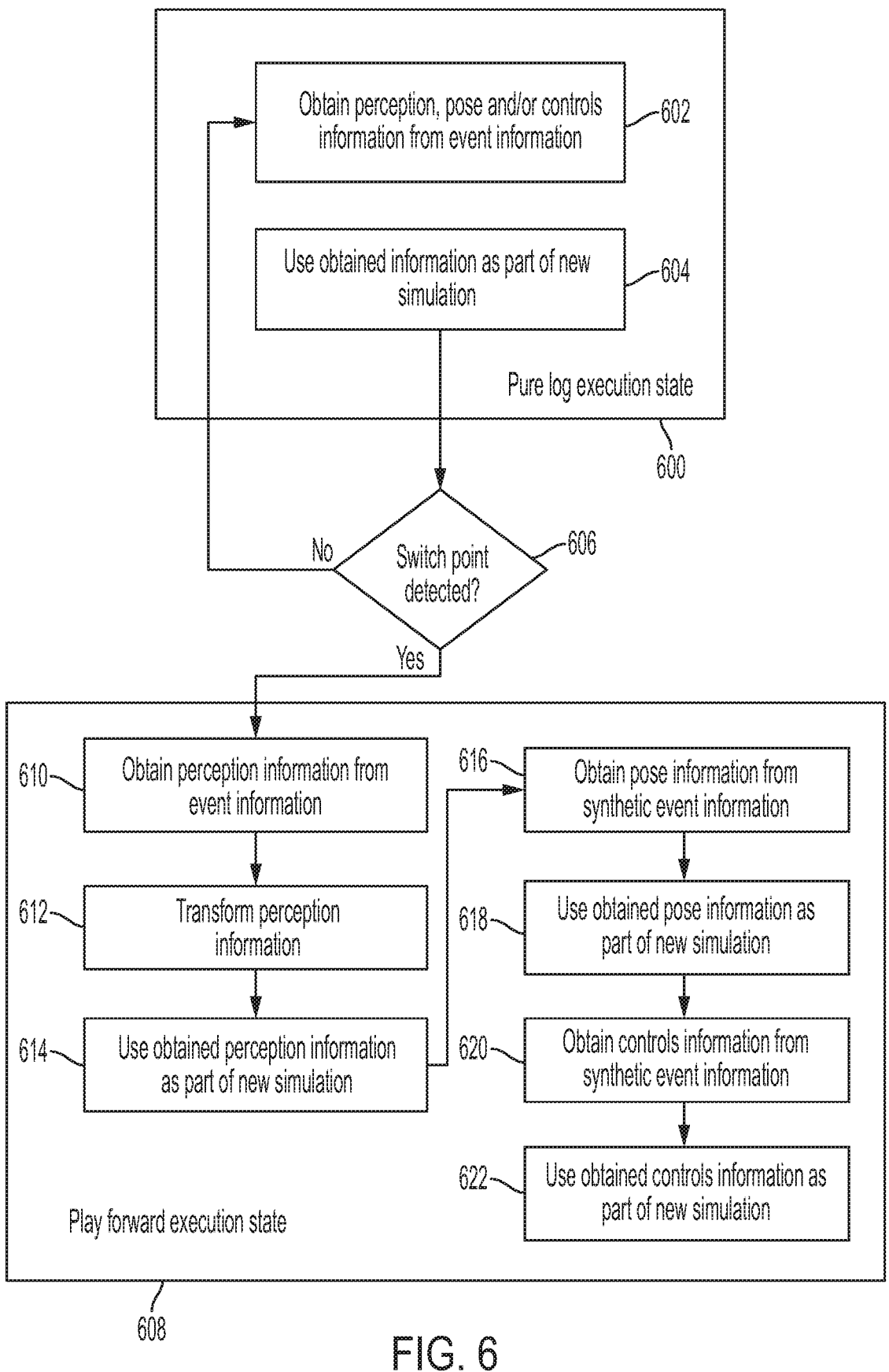
FIG. 6 illustrates an example method of generating a simulation.

A simulation system may generate 508 a simulation based on at least a portion of the received perception information and at least a portion of the received synthetic perception data. FIG. 6 illustrates an example method of generating 508 a simulation according to an embodiment.

As illustrated by FIG. 6, a simulation system may operate 600 in a pure log execution stage until the simulation system determines that it has encountered a switch point. A switch point refers to a point where the received perception data begins to diverge from the received synthetic perception data. For instance, referring to the example above, the received perception data may be substantially the same or similar to the received synthetic perception data until the AV reaches the four-way intersection, at which point the received synthetic perception data (indicating that the AV made a right-hand turn) diverges from the received perception data (indicating that the AV proceeded straight through the intersection). This may be recognized by the system as a switch point.

In various embodiments, a switch point may be indicated in the received event information. For instance, log data may include identifying event tags or other indicators which identify the start or beginning of an event. One or more such indicators may be associated with a timestamp. The simulation system may parse the received event information and identify an indicator. The simulation system may obtain the associated timestamp, and use the timestamp as a switch point in the play-forward stage. In other embodiments, a user may manually specify a timestamp to use as a switch point. For example, a user may manually run play-forward against a log and specify a timestamp to use as a switch point.

During a pure log execution stage, the simulation system may obtain 602 perception information, pose information and/or control information from the received event information. The simulation system may use 604 at least a portion of this obtained perception information, pose information and/or control information as part of a new AV simulation. For instance, the simulation system may create one or more new files associated with a new AV simulation, and may cause at least a portion of the obtained perception information, pose information, and/or control information to be included in the new files. The simulation system may not use, and may ignore the synthetic perception data that it receives while it is operating in a pure log execution stage.

Upon detecting 606 a switch point, the simulation system may begin to operate 608 in a play-forward execution stage. During a play-forward execution stage, the simulation system may obtain 610 perception information from the received event information. The simulation system may transform 612 at least a portion of the perception information. For instance, perception information may need to be adjusted to account for a difference between an original AV location as set forth in one or more event log files and an updated position as provided by a vehicle dynamics model.

Event log files may include tracks that contain position data that defines the track in reference to the AV location and in reference to the AV's position on a map. The play-forward execution stage moves track position data from the log AV frame into the map reference frame, and then moves relevant data from a common map frame to the simulation AV location frame as part of the transformation.

The simulation system may use 614 at least a portion of the transformed perception information as part of the new AV simulation. For instance, the simulation system may cause at least a portion of the obtained perception information to be provided to the prediction system, the motion planning system, the control system and/or the vehicle dynamics system.

During a play-forward execution stage, the simulation system may obtain 616 pose information from the received synthetic event information. Pose information included in any event information that the simulation system receives during a play-forward execution stage may be ignored by the simulation system. The simulation system may use 618 at least a portion of the obtained pose information as part of the new AV simulation. For instance, the simulation system may cause at least a portion of the obtained pose information to be included in the files associated with the new AV simulation.

During a play-forward execution stage, the simulation system may obtain 620 control information from the received synthetic event information. Control information included in any event information that the simulation system receives during a play-forward execution stage may be ignored by the simulation system. The simulation system may use 622 at least a portion of the obtained control information as part of the new AV simulation. For instance, the simulation system may cause at least a portion of the obtained control information to be included in the new files associated with the new AV simulation. During operation in a play-forward execution stage, the simulation system may not use, and may ignore pose information and/or control information from event information.

In various embodiments, a simulation system may cause the new AV simulation to be executed 510. For example, a simulation system may cause output from a new AV simulation to be displayed to a user via one or more display devices. For instance, the simulation system may execute or run one or more of the files that are associated with the new AV simulation. In various embodiments, the new AV simulation may include both simulated and real-world log data.

Figure 7:
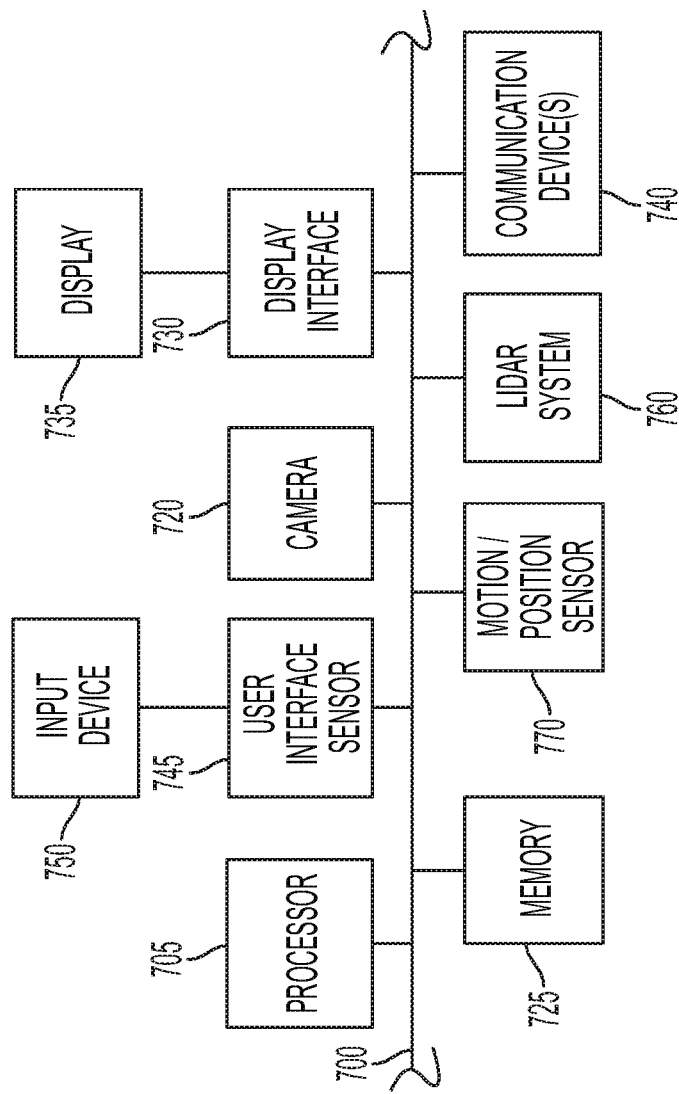
FIG. 7 illustrates various components of an example computing device.

FIG. 7 depicts an example of internal hardware that may be included in any of the electronic components of the system, such as internal processing systems of the AV, external monitoring and reporting systems, or remote servers. An electrical bus 700 serves as an information highway interconnecting the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 730 may permit information from the bus 700 to be displayed on a display device 735 in visual, graphic or alphanumeric format, such on an in-dashboard display system of the vehicle. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication systems. The communication device(s) 740 may be configured to be communicatively connected to a communications network, such as the Internet, a local area network or a cellular telephone data network.

The hardware may also include a user interface sensor 745 that allows for receipt of data from input devices 750, such as a keyboard or keypad, a joystick, a touchscreen, a touch pad, a remote control, a pointing device and/or microphone. Digital image frames also may be received from a camera 720 that can capture video and/or still images. The system also may receive data from a motion and/or position sensor 770 such as an accelerometer, gyroscope or inertial measurement unit. The system also may receive data from a LiDAR system 760 such as that described earlier in this document.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices, as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" or "AV" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, braking, parking and similar systems.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

The invention claimed is:

1. A method of creating a simulation to simulate behavior of an autonomous vehicle, the method comprising:
by an electronic device of a simulation system:
identifying an event that is to be analyzed;
receiving from an autonomous vehicle system a first data stream that comprises event information from one or more vehicle event log files that corresponds to the event, wherein the event information comprises the following obtained by one or more sensors of the autonomous vehicle during occurrence of the event:
first perception information,
first pose information, and
first control information;
receiving from a vehicle dynamics model a second data stream that comprises synthetic event information that corresponds to the event, wherein the synthetic event information is generated by a simulation that simulates operation of the autonomous vehicle in a virtual environment, wherein the synthetic information comprises the following:
second pose information, and
second control information;
operating in a pure log execution stage by:
using at least a portion of the first perception information in a new simulation of the autonomous vehicle, using at least a portion of the first pose information in the new simulation, and
using at least a portion of the first control information in the new simulation;
detecting a switch point indicating a point where the first perception information begins to diverge from the received synthetic perception data;
upon detection of the switch point, operating in a play-forward execution stage by:
using at least a portion of the first perception information into the new simulation,
using at least a portion of the second pose information in the new simulation, and
using at least a portion of the second control information in the new simulation; and
causing the new simulation to be executed.

2. The method of claim 1, wherein identifying an event that is to be analyzed comprises receiving from a user an indication of a time period during which the event occurred.

3. The method of claim 1, wherein the first data stream comprises event information organized in a time sequential fashion.

4. The method of claim 1, further comprising detecting the switch point by:
identifying an event indicator in the event information, wherein the event indicator indicates the beginning of the event;
determining a timestamp associated with the event indicator;
detecting the switch point at the timestamp.

5. The method of claim 1, further comprising, upon detection of the switch point, transforming the first perception information by:
moving track position data from the event information into a map reference frame; and
moving data from the map reference frame to a simulation frame.

6. The method of claim 1, wherein the switch point corresponds to a point at which the simulation diverges from the event as depicted by event information from the one or more vehicle event log files.

7. The method of claim 1, further comprising not using any portion of the synthetic event information during operation in the pure log execution stage.

8. The method of claim 1, further comprising not using any portion of the first control information during operation in the play-forward execution stage.

9. The method of claim 1, further comprising not using any portion of the first pose information during operation in the play-forward execution stage.

10. A system of creating a simulation to simulate behavior of an autonomous vehicle, the system comprising:
a simulation system having an electronic device;
a computer-readable storage medium comprising one or more programming instructions that, when executed, cause the electronic device to:
identify an event that is to be analyzed;
receive from an autonomous vehicle system a first data stream that comprises event information from one or more vehicle event log files that corresponds to the event, wherein the event information comprises the following obtained by one or more sensors of an autonomous vehicle during occurrence of the event:
first perception information,
first pose information, and
first control information;
receive from a vehicle dynamics model a second data stream that comprises synthetic event information that corresponds to the event, wherein the synthetic event information is generated by a simulation that simulates operation of the autonomous vehicle in a virtual environment, wherein the synthetic information comprises the following:
second pose information, and
second control information;
operate in a pure log execution stage by:
using at least a portion of the first perception information in a new simulation of the autonomous vehicle,
using at least a portion of the first pose information in the new simulation, and
using at least a portion of the first control information in the new simulation,
detecting a switch point indicating a point where the first perception information begins to diverge from the received synthetic perception data;
upon detection of the switch point, operate in a play-forward execution stage by:
using at least a portion of the first perception information into the new simulation,
using at least a portion of the second pose information in the new simulation, and
using at least a portion of the second control information in the new simulation; and
cause the new simulation to be executed.

11. The system of claim 10, wherein the one or more programming instructions that, when executed, cause the electronic device to identify an event that is to be analyzed comprise one or more programming instructions that, when executed, cause the electronic device to receive from a user an indication of a time period during which the event occurred.

12. The system of claim 10, wherein the first data stream comprises event information organized in a time sequential fashion.

13. The system of claim 10, wherein the computer-readable storage medium further comprises one or more programming instructions that, when executed, cause the electronic device to detect the switch point by:
identifying an event indicator in the event information, wherein the event indicator indicates the beginning of the event;
determining a timestamp associated with the event indicator;
detecting the switch point at the timestamp.

14. The system of claim 10, wherein the computer-readable storage medium further comprises one or more programming instructions that, when executed, cause the electronic device to, upon detection of the switch point, transform the first perception information by:
moving track position data from the event information into a map reference frame; and
moving data from the map reference frame to a simulation frame.

15. The system of claim 10, wherein the switch point corresponds to a point at which the simulation diverges from the event as depicted by event information from the one or more vehicle event log files.

16. The system of claim 10, wherein the computer-readable storage medium further comprises one or more programming instructions that, when executed, cause the electronic device to not use any portion of the synthetic event information during operation in the pure log execution stage.

17. The system of claim 10, wherein the computer-readable storage medium further comprises one or more programming instructions that, when executed, cause the electronic device to not using any portion of the first control information during operation in the play-forward execution stage.

18. The system of claim 10, wherein the computer-readable storage medium further comprises one or more programming instructions that, when executed, cause the electronic device to not using any portion of the first pose information during operation in the play-forward execution stage.

* * * * *